(12) United States Patent
Okuno

(10) Patent No.: US 8,179,603 B2
(45) Date of Patent: May 15, 2012

(54) OPTICAL ELEMENT AND OPTICAL SYSTEM HAVING THE SAME

(75) Inventor: Takeharu Okuno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/783,175

(22) Filed: May 19, 2010

(65) Prior Publication Data

US 2010/0296177 A1 Nov. 25, 2010

(30) Foreign Application Priority Data

May 21, 2009 (JP) ................................. 2009-123180

(51) Int. Cl.
 *G02B 5/02* (2006.01)
 *G02B 3/02* (2006.01)
(52) U.S. Cl. ........ 359/599; 359/615; 359/642; 359/708; 359/718; 359/722; 359/737; 359/741; 359/742
(58) Field of Classification Search .................. 359/599, 359/615, 642, 708, 718, 722, 737, 741, 742
See application file for complete search history.

(56) References Cited

U.S. PATENT DOCUMENTS

| | | | | |
|---|---|---|---|---|
| 4,497,860 A * | 2/1985 | Brady, Jr. | ....................... | 359/620 |
| 6,570,710 B1 * | 5/2003 | Nilsen et al. | ................... | 359/625 |
| 6,799,859 B1 * | 10/2004 | Ida et al. | ......................... | 362/26 |
| 6,997,595 B2 * | 2/2006 | Mi et al. | ......................... | 359/834 |
| 7,156,547 B2 * | 1/2007 | Toshima et al. | ................ | 359/599 |
| 7,529,026 B2 * | 5/2009 | Gardner et al. | ................ | 359/627 |

FOREIGN PATENT DOCUMENTS

JP 10-307256 A 11/1998

* cited by examiner

*Primary Examiner* — Evelyn A. Lester
(74) *Attorney, Agent, or Firm* — Canon U.S.A., Inc. IP Division

(57) ABSTRACT

An optical element that has a fine textured structure formed on an exit surface thereof. The fine textured structure satisfies the following conditions:

$\lambda min/1.71 nsub < p < \lambda min/2$ and $0.6\lambda min < h < 1.5\lambda min$, where $\lambda min$ is the shortest wavelength used in the optical element, nsub is the refractive index of a substrate on which the fine textured structure is formed, p is the pitch of the fine textured structure, and h is the height of the fine textured structure. The textured structure includes a part where some rays incident parallel to the optical axis are totally reflected.

7 Claims, 4 Drawing Sheets

OPTICAL ELEMENT AND OPTICAL SYSTEM HAVING THE SAME

BACKGROUND OF THE INVENTION

1. Field of the Invention

The present invention relates to an optical element, and more specifically, it relates to an optical element that has a part with a fine textured structure where incident rays are totally reflected.

2. Description of the Related Art

Optical elements (lenses) having various shapes and refractive indices are used in optical systems used for photography.

In particular, a concave meniscus lens or the like used as the front (object-side) lens of a wide-angle lens has a part where some of incident rays other than photographing light are totally reflected. The totally reflected rays are reflected again by the edge of the lens or a component of the lens barrel and reach the image plane. This generates unwanted light defects in a photograph such as flare or ghost images.

To prevent flare or ghost images, an antireflection film that is a dielectric multilayer film (also called multicoat film) formed on the surface of lenses has been proposed. Notwithstanding the high-performance of an antireflection film, such a film cannot prevent total reflection, and therefore it cannot solve the above-described problem.

Another solution to the above-described problem has been by Japanese Patent Laid-Open No. 10-307256 (hereafter "JP 10-307256"). JP 10-307256 discloses a configuration in which a second lens having negative refractive power is cemented to a first lens having positive refractive power to prevent total reflection on the second surface of the first lens.

In the disclosure of JP 10-307256, two lenses having opposite signs of refractive power are cemented together. Such a cemented lens having a desired refractive power is large, heavy, and expensive to manufacture.

SUMMARY OF THE INVENTION

One aspect of the present invention relates to an optical element having an optical axis and configured to transmit light within a predetermined range of wavelengths. The optical element includes a fine textured structure formed on an exit surface, the fine textured structure has a pitch shorter than the wavelength used and satisfies the following conditions:

$$\lambda\min/1.71n\text{sub} < p < \lambda\min/2 \text{ and}$$

$$0.6\lambda\min < h < 1.5\lambda\min,$$

where λmin is the shortest wavelength used in the optical element, nsub is the refractive index of a substrate on which the fine textured structure is formed, p is the pitch of the fine textured structure, and h is the height of the fine textured structure. The textured structure includes a part where some rays incident parallel to the optical axis are totally reflected.

Further features of the present invention will become apparent from the following description of exemplary embodiments with reference to the attached drawings.

DESCRIPTION OF THE EMBODIMENTS

The preferred embodiments of the present invention will now be described with reference to the drawings.

Figure 1A:
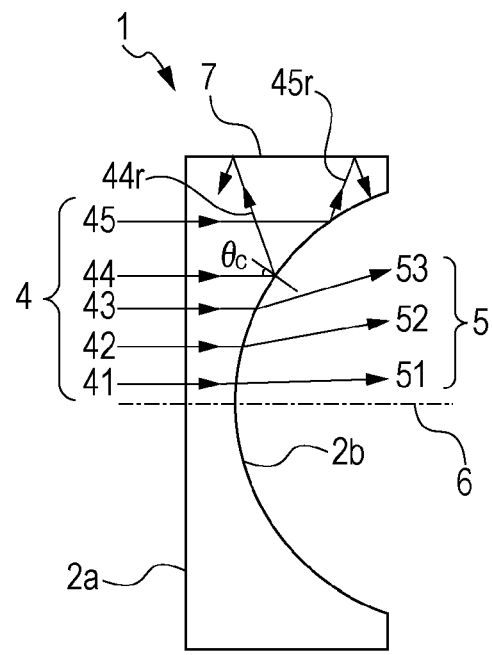
FIGS. 1A and 1B are conceptual diagrams of the present invention.
Figure 1B:
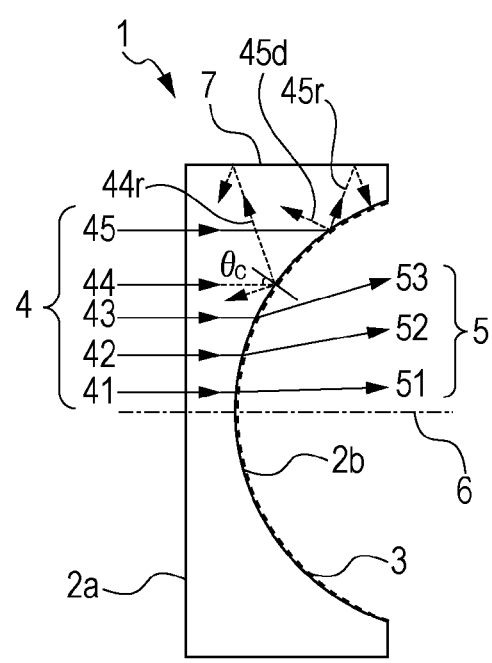

FIGS. 1A and 1B are conceptual diagrams for illustrating the present invention.

FIG. 1A shows a conventional optical element.

For illustration purposes, the optical element 1 is a plano-concave lens used in the visible range (400 to 700 nm) and is formed of a glass having a refractive index (n) of 1.60 at a wavelength (λ) of 400 nm, the shortest wavelength used.

Light rays 4 incident parallel to the optical axis 6 are not refracted when passing through the entrance surface 2a, and reach the exit surface 2b on which an antireflection film that is a dielectric multilayer film is formed. The exit surface 2b is a concave surface. The maximum value of the half-aperture angle of the concave surface is 72°. Therefore, rays 41, 42, and 43 incident on the exit surface 2b at angles smaller than the critical angle θc are transmitted therethrough. Rays 51, 52 and 53 representing light rays 5 exit from the optical element 1 as photographing light. On the other hand, rays 44 and 45 incident on the exit surface 2b at angles equal to or larger than θc are totally reflected and are not transmitted. More specifically, the ray 45 incident on a part of the exit surface 2b where the aperture angle of the concave surface is 45° or more travels to the exit side (to the right) after being reflected (45r) and therefore also travels to the exit side after being reflected by the non-effective area 7 of the lens. Therefore, when the optical element 1 is used in an optical system, the reflected light 45r constitutes unwanted light which can cause flare or ghost images that decrease the image quality of a photograph.

FIG. 1B shows an optical element in accordance with principles of the present invention. In the optical element of FIG. 1B, a fine textured structure (subwave structure) is formed on a predetermined surface thereof. For ease of comparison, the optical element 1 of FIG. 1B has the same shape and is formed of the same material as the conventional optical element shown in FIG. 1A. However, a fine textured structure 3 is formed on the exit surface 2b. The pitch p and height h of the fine textured structure 3 are set within ranges satisfying the following conditions:

$$\lambda\min/1.71n\text{sub} < p < \lambda\min/2 \tag{1}$$

and $$0.6\lambda\min < h < 1.5\lambda\min \tag{2},$$

where λmin is the shortest wavelength used in the optical element, and nsub is the refractive index of the substrate of the optical element.

The reason why the pitch is set as in expression (1) will be described.

Figure 2:
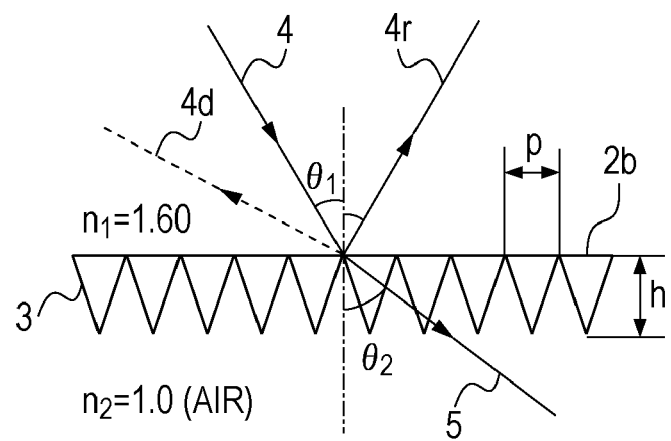
FIG. 2 is a partially enlarged view for illustrating a concept of the fine textured structure in accordance with present invention.

FIG. 2 is an enlarged view of the fine textured structure 3 formed on the exit surface 2b of optical element 1.

To generate reflection diffracted light from a ray 4 having a wavelength λmin incident on the exit surface 2b at an incident angle θ1, the pitch p must satisfy the following condition:

$$p > \lambda\min/(n1 \sin\theta1 + n1).$$

That is to say, in the case where the incident angle θ1 is 45° and if the pitch p is 146 nm or more, reflection diffracted light is generated.

To prevent transmission of diffracted light from a ray 4 having a wavelength λmin incident at a critical angle θc, the pitch p must satisfy the following condition:

$$p > \lambda\min/(n1 \sin\theta c + n1).$$

In the case of a glass having a refractive index of 1.60, the critical angle θc is 38.7°, and n1 sin θc is 1.0. Therefore, in the case where the pitch p is 200 nm or less, diffraction does not occur in transmitted light. Therefore, in the case of a ray having a wavelength of 400 nm incident at an angle of 45° or more, if the pitch is within a range of 146 to 200 nm, reflection diffracted light is generated but transmission of diffracted light is prevented. The height of the fine textured structure 3 is preferably set within a range of 240 to 600 nm to exert a sufficient antireflection effect and to generate diffracted light in reflected light.

In the optical element shown in FIG. 1B, forming a fine textured structure satisfying the expressions (1) and (2) on the exit surface 2b can prevent the generation of unwanted light that may produce flare or ghost. That is to say, the ray 45, which is totally reflected by the exit surface 2b and becomes unwanted light, divides into specular reflected light 45r and reflection diffracted light 45d when being reflected. However, the energy of the specular reflected light 45r traveling to the exit side can be reduced with an appropriately designed fine textured structure, so that the generation of flare or ghost can be suppressed. As for the rays 41, 42, and 43 incident on exit surface 2b that are not totally reflected, diffracted light is not generated when these rays are transmitted, and therefore the image quality is not affected by unwanted light when the optical element 1 is used in an optical system.

First Embodiment

Figure 3:
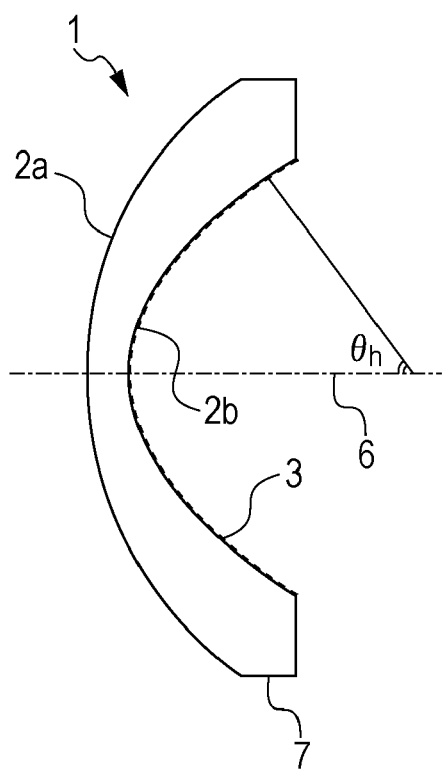
FIG. 3 is a sectional view of an optical element according to a first embodiment.

FIG. 3 is a sectional view of an optical element according to a first embodiment of the present invention.

In FIG. 3, as a practical example, an optical element 1 is a meniscus lens used in the visible range (400 to 700 nm) and is formed of a glass having a refractive index of 1.60 at a wavelength of 400 nm, the shortest wavelength used.

The entrance surface 2a is a spherical surface having a curvature radius of 31.87 mm and an effective diameter of 49.96 mm. The exit surface 2b is an aspherical surface having an effective diameter of 37.29 mm. When a surface position in the optical-axis direction at a distance R from the optical axis in a direction perpendicular to the optical axis is denoted as Sag (R), the aspherical surface has a shape satisfying the following relationship:

$$Sag(R) = \frac{(1/r) \times R^2}{1 + \sqrt{1-(1+K)\times(1/r)^2 \times R^2}} + A4 \times R^4 + A6 \times R^6 + A8 \times R^8 + A10 \times R^{10} + A12 \times R^{12}$$

where r=13.52, K=−6.05×10⁻¹, A4=2.34×10⁻⁷, A6=−5.85×10⁻⁸, A8=2.32×10⁻¹⁰, A10=−8.25×10⁻¹³, and A12=0. The maximum value of the half-aperture angle θh of this surface is 53.4°.

An antireflection film that is a dielectric multilayer film is formed on the entrance surface 2a.

Figure 4:
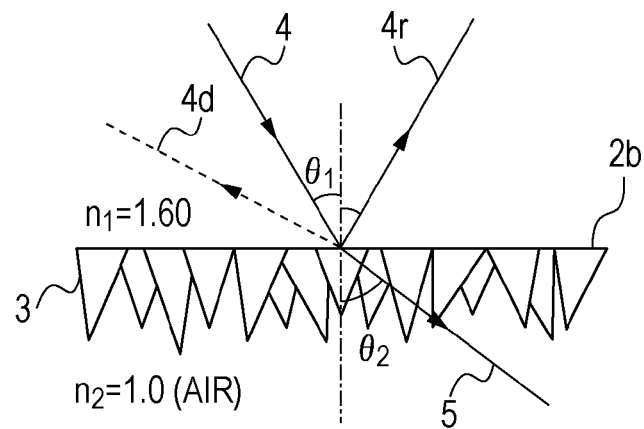
FIG. 4 is a partially enlarged view of the optical element according to the first embodiment.

A fine textured structure 3 is formed on the exit surface 2b. The fine textured structure 3 is obtained, for example, by forming a film containing aluminum oxide by the sol-gel method and then soaking the film in hot water at 100° C. Other methods known to those of ordinary skill in the art may also be applicable. In the practical example illustrated in FIG. 3, the fine textured structure 3 has an average pitch of 160 nm and an average height of 270 nm. The reason for having an average pitch and an average height as stated is that the fine textured structure 3 in a practical example is not a regular array such as the conceptual one shown in FIG. 2. In a practical example, the pitch and height may vary as shown in FIG. 4. In such a case, if average values of the pitch and height satisfy the expressions (1) and (2), the same advantageous effect can be obtained.

In the case where the exit surface of an optical element has an aspherical shape such as that shown in FIG. 3, in a part where incident rays are totally reflected by the exit surface 2b, the exit directions of rays after total reflection are prone to be concentrated in the same direction. Therefore, unwanted light such as flare or ghost is more prone to be generated than the case of a spherical surface. However, in this embodiment, a fine textured structure 3 having an average pitch of 160 nm and an average height of 270 nm is formed on the exit surface 2b having an aspherical shape. When rays are totally reflected by the exit surface 2b, reflection diffracted light is generated, and the energy of rays causing unwanted light can be reduced. Therefore, when this optical element is used in an optical system, the generation of flare or ghost can be suppressed, and a higher-grade optical system can be made.

The optical element of this embodiment is a meniscus lens. However, the present invention is not limited thereto. Any shape of optical element, for example, a biconvex lens or a biconcave lens, produces the same advantageous effect as long as the optical element has a part where some of rays incident parallel to the optical axis are totally reflected. In particular, it is desirable that rays incident parallel to the optical axis of the optical element, but incident on the exit surface at an angle equal to or greater than the critical angle are totally reflected.

Second Embodiment

Figure 5:
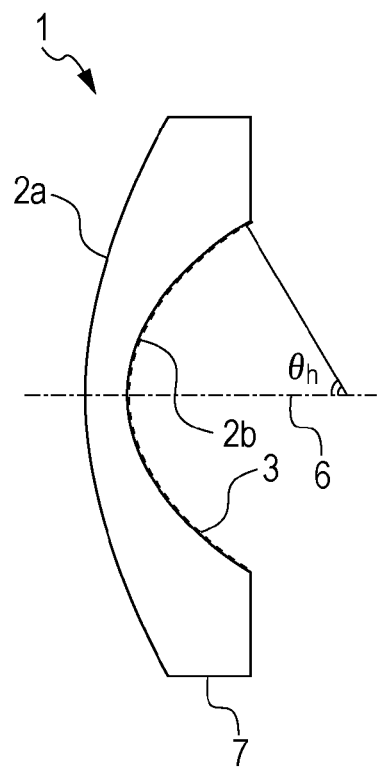
FIG. 5 is a sectional view of an optical element according to a second embodiment.

FIG. 5 is a sectional view of an optical element according to a second embodiment of the present invention.

In FIG. 5, as another practical example, an optical element 1 is a meniscus lens used in the visible range (400 to 700 nm) and is formed of a glass having a refractive index of 1.89 at a wavelength of 400 nm, the shortest wavelength used.

The entrance surface 2a is a spherical surface having a curvature radius of 52.44 mm and an effective diameter of 50.09 mm. The exit surface 2b is an aspherical surface having an effective diameter of 32.69 mm. When a surface position in the optical-axis direction at a distance R from the optical axis in a direction perpendicular to the optical axis is denoted as Sag (R), the aspherical surface has a shape satisfying the following relationship:

$$Sag(R) = \frac{(1/r) \times R^2}{1 + \sqrt{1-(1+K)\times(1/r)^2 \times R^2}} + A4 \times R^4 + A6 \times R^6 + A8 \times R^8 + A10 \times R^{10} + A12 \times R^{12}$$

where r=13.78, K=−8.32×10⁻¹, A4=1.23×10⁻⁵, A6=−1.79×10⁻⁸, A8=2.37×10⁻¹⁰, A10=−7.23×10⁻¹³, and A12=9.90×10⁻¹⁶. The maximum value of the half-aperture angle θh of this surface is 59.5°.

An antireflection film that is a dielectric multilayer film is formed on the entrance surface 2a.

A fine textured structure 3 is formed on the exit surface 2b. The fine textured structure 3 in this example may be obtained by the same method as in the previous example, or it may be formed of a material such as glass, quartz or the like. The fine textured structure 3 has a pitch of 200 nm and a height of 580 nm.

In the case where the exit surface of an optical element has an aspherical shape such as that shown in FIG. 5, in a part where incident rays are totally reflected by the exit surface 2b, the exit directions of rays after total reflection are prone to be concentrated in the same direction. Therefore, unwanted light such as flare or ghost is more prone to be generated than the case of a spherical surface. However, in this embodiment, a fine textured structure 3 having a pitch of 200 nm and a height of 580 nm is formed on the exit surface 2b having an aspherical shape. When rays are totally reflected by the exit surface 2b, reflection diffracted light is generated, and the energy of rays causing unwanted light can be reduced. Therefore, when this optical element is used in an optical system, the generation of flare or ghost can be suppressed, and a higher-grade optical system can be made.

The optical element of this embodiment is a meniscus lens. However, the present invention is not limited to this. Any shape of optical element, for example, a biconvex lens or a biconcave lens, produces the same advantageous effect as long as it has a part where some of rays incident parallel to the optical axis are totally reflected.

Third Embodiment

Figure 6:
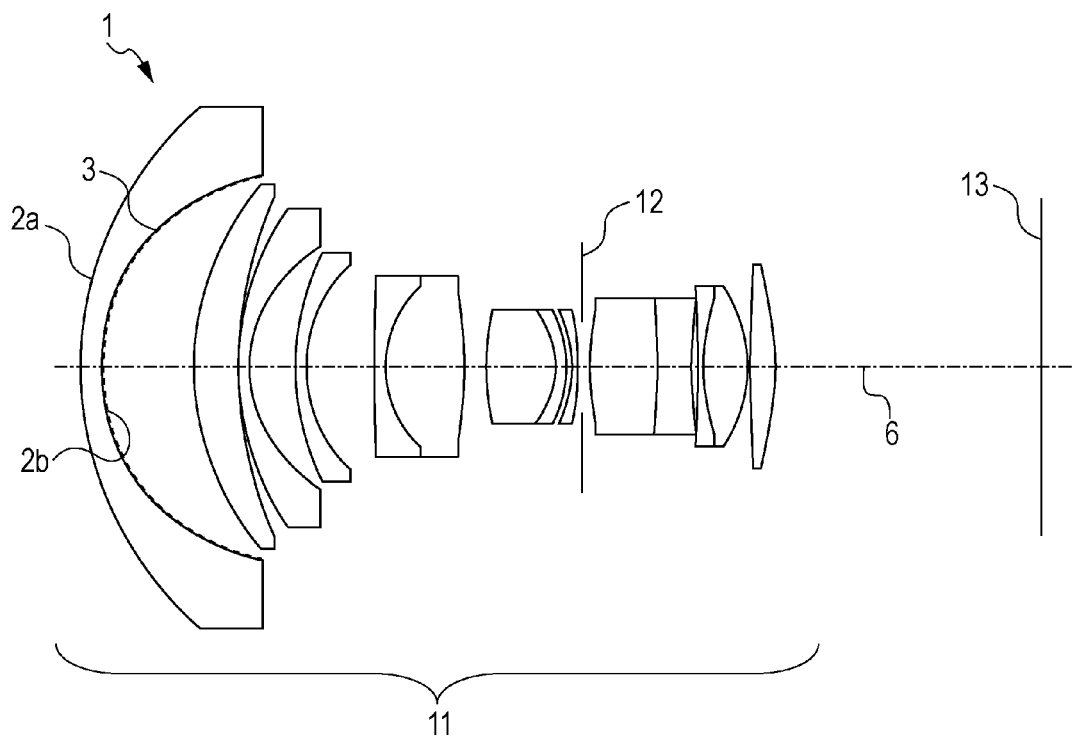
FIG. 6 is a sectional view of an optical system according to a third embodiment.

FIG. 6 is a sectional view of a photographing optical system according to a third embodiment of the present invention. In FIG. 6, reference numeral 11 denotes an optical system, which is a wide field angle lens for a camera having a focal length of 14 mm. The design values for the optical system of FIG. 6 are as in Numerical Embodiment 1, shown below. Reference numeral 12 denotes a stop, and reference numeral 13 denotes a light detecting element.

In the optical system 11, a fine textured structure 3 is formed on the exit surface 2b of an optical element 1 (first lens). The fine textured structure 3 is obtained by forming a film containing aluminum oxide by the sol-gel method and then soaking the film in hot water at 100° C. The fine textured structure 3 has an average pitch of 180 nm and an average height of 320 nm.

Some of incident rays other than photographing light are totally reflected by the exit surface 2b of the optical element. However, when rays are totally reflected by the exit surface 2b, reflection diffracted light is generated, and the energy of rays causing unwanted light can be reduced. Therefore, the generation of flare or ghost can be suppressed, and a higher-grade optical system can be made.

The following are the numerical data of the optical system according to this embodiment.

In the numerical data, f is the focal length, FNo is the F-number, and ω is the half angle of view. Reference letter ri denotes the curvature radius of the i-th surface from the object side (the left-most surface in the figure). Reference letter di denotes the distance between the i-th surface and the (i+1)th surface. Reference letter ni denotes the refractive index of the i-th member from the object side at the d-line. Reference letter vi denotes the Abbe number vd of the i-th member at the d-line. Abbe number vd is expressed by the following expression:

$$vd=(Nd-1)/(NF-NC),$$

where Nd is the refractive index at the wavelength of the d-line (587.6 nm), NF is the refractive index at the wavelength of the F-line (486.1 nm), and NC is the refractive index at the wavelength of the C-line (656.3 nm).

| Numerical Embodiment 1 (Numerical Data) | | | |
|---|---|---|---|
| f = 14.3 | FNo = 2.89 | ω = 56.5° | |
| r01 = 43.611 | d01 = 3.10 | n1 = 1.69680 | v1 = 55.5 |
| r02 = 26.108 | d02 = 11.30 | | |
| r03 = 58.696 | d03 = 5.83 | n2 = 1.60311 | v2 = 60.7 |
| r04 = 52.318 | d04 = 0.15 | | |
| r05 = 36.653 | d05 = 1.70 | n3 = 1.69680 | v3 = 55.5 |
| r06 = 17.777 | d06 = 6.39 | | |
| r07 = 48.633 | d07 = 1.30 | n4 = 1.77250 | v4 = 49.6 |
| r08 = 20.569 | d08 = 8.24 | | |
| r09 = 260.012 | d09 = 1.50 | n5 = 1.69680 | v5 = 55.5 |
| r10 = 15.580 | d10 = 10.11 | n6 = 1.59551 | v6 = 39.2 |
| r11 = −50.458 | d11 = 3.24 | | |
| r12 = 54.936 | d12 = 8.21 | n7 = 1.56732 | v7 = 42.8 |
| r13 = −10.586 | d13 = 1.50 | n8 = 1.77250 | v8 = 49.6 |
| r14 = −14.355 | d14 = 0.82 | | |
| r15 = −14.991 | d15 = 0.90 | n9 = 1.77250 | v9 = 49.6 |
| r16 = −42.782 | d16 = 0.50 | | |
| r17 = (Stop) | d17 = 1.40 | | |
| r18 = 84.663 | d18 = 8.63 | n10 = 1.60311 | v10 = 60.7 |
| r19 = −69.334 | d19 = 4.00 | n11 = 1.74320 | v11 = 49.3 |
| r20 = 78.755 | d20 = 0.67 | | |
| r21 = −180.599 | d21 = 0.80 | n12 = 1.92286 | v12 = 21.3 |
| r22 = 32.151 | d22 = 5.88 | n13 = 1.48749 | v13 = 70.2 |
| r23 = −18.364 | d23 = 0.15 | | |
| r24 = 352.989 | d24 = 3.30 | n14 = 1.80400 | v14 = 46.6 |
| r25 = −38.634 | | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123180 filed May 21, 2009, which is hereby incorporated by reference herein in its entirety.

What is claimed is:

1. An optical element having an optical axis and configured to transmit light within a predetermined range of wavelengths, the optical element comprising:
   a fine textured structure formed on an exit surface and having a pitch shorter than a wavelength used in the optical element,
   wherein the fine textured structure satisfies the following conditions:

$$\lambda min/1.71 nsub < p < \lambda min/2 \text{ and}$$

$$0.6\lambda min < h < 1.5\lambda min,$$

where λmin is the shortest wavelength used in the optical element, nsub is the refractive index of a substrate on which the fine textured structure is formed, p is the pitch of the fine textured structure, and h is the height of the fine textured structure, and wherein the exit surface on which the fine textured structure is formed includes a part where some rays incident parallel to the optical axis are totally reflected.

2. The optical element according to claim 1, wherein the exit surface of the optical element is an aspherical surface.

3. The optical element according to claim 2, wherein the aspherical surface has a part having a half-aperture angle of 45° or more.

4. The optical element according to claim 1, wherein the fine textured structure contains aluminum or aluminum oxide.

5. The optical element according to claim 1, wherein the fine textured structure is formed of the same material as the substrate.

6. The optical element according to claim 1, wherein the rays incident parallel to the optical axis that are totally reflected are incident on the exit surface at an angle equal to or greater than the critical angle.

7. An photographing optical system having the optical element according to claim 1.

* * * * *